United States Patent
King et al.

(10) Patent No.: US 8,973,371 B2
(45) Date of Patent: Mar. 10, 2015

(54) GAS TURBINE ENGINE WITH TURBINE COOLING ARRANGEMENT

(75) Inventors: Jonathan M King, Melbourne (GB); Crispin D. Bolgar, Nottingham (GB); Guy D. Snowsill, Belper (GB); Michael J. Sheath, Nottingham (GB); Geoffrey M Dailey, Newton Solney (GB)

(73) Assignee: Rolls-Royce PLC, London (GB)

( * ) Notice: Subject to any disclaimer, the term of this patent is extended or adjusted under 35 U.S.C. 154(b) by 804 days.

(21) Appl. No.: 13/224,894

(22) Filed: Sep. 2, 2011

(65) Prior Publication Data

US 2012/0060507 A1 Mar. 15, 2012

(30) Foreign Application Priority Data

Sep. 10, 2010 (GB) .................................. 1015028.2

(51) Int. Cl.
*F02C 6/08* (2006.01)
*F02C 3/13* (2006.01)
(Continued)

(52) U.S. Cl.
CPC ... *F02C 6/08* (2013.01); *F02C 7/18* (2013.01); *F02C 3/13* (2013.01); *F01D 5/081* (2013.01); *F01D 5/082* (2013.01); *F01D 11/001* (2013.01); *F01D 11/04* (2013.01); *F01D 11/06* (2013.01)
USPC .................. 60/782; 60/785; 60/806

(58) Field of Classification Search
CPC ......... F01D 5/081; F01D 5/082; F01D 11/04; F01D 11/06; F01D 11/001; F02C 6/08; F02C 3/13; F02C 7/18
USPC ........................................... 60/806, 782, 785
See application file for complete search history.

(56) References Cited

U.S. PATENT DOCUMENTS

| 4,302,148 A | 11/1981 | Tubbs |
| 4,415,310 A | 11/1983 | Bouiller et al. |

(Continued)

FOREIGN PATENT DOCUMENTS

| EP | 1 533 473 A1 | 5/2005 |
| EP | 1 921 256 A2 | 5/2008 |

(Continued)

OTHER PUBLICATIONS

Dec. 13, 2010 Search Report issued in British Application No. GB1015028.2.

(Continued)

*Primary Examiner* — William H Rodriguez
*Assistant Examiner* — Carlos A Rivera
(74) *Attorney, Agent, or Firm* — Oliff PLC

(57) ABSTRACT

A gas turbine engine comprising a turbine section cooling system and a method of cooling a turbine section of a gas turbine engine is provided. The gas turbine engine comprises in flow series a compressor section, a combustor, and a turbine section, the engine further comprising a turbine section cooling system. The turbine section cooling system including a first compressed air bleed arrangement and a second compressed air bleed arrangement. The first compressed air bleed arrangement bleeds a first flow of compressed air from a high pressure stage of the compressor section. The first flow of compressed air bypasses the combustor and arrives at the turbine section to form a sealing and/or cooling flow at a row of stator vanes upstream of an adjacent rotor disc. The second compressed air bleed arrangement bleeds a second flow of compressed air from one or more lower pressure stages of the compressor section. The second flow of compressed air bypasses the combustor and arrives at the turbine section to form a cooling flow. A first portion of the cooling flow is routed to a front face of the rotor disc and a second portion of the cooling flow is routed to a rear face of the rotor disc.

13 Claims, 3 Drawing Sheets

(51) Int. Cl.
*F02C 7/18* (2006.01)
*F01D 5/08* (2006.01)
*F01D 11/00* (2006.01)
*F01D 11/04* (2006.01)
*F01D 11/06* (2006.01)

(56) References Cited

U.S. PATENT DOCUMENTS

| | | | | |
|---|---|---|---|---|
| 4,741,153 | A | * | 5/1988 | Hallinger et al. ............... 60/806 |
| 4,882,902 | A | * | 11/1989 | Reigel et al. .................... 60/806 |
| 4,890,981 | A | * | 1/1990 | Corsmeier et al. ........ 416/220 R |
| 5,134,844 | A | * | 8/1992 | Lee et al. ........................ 60/806 |
| 5,232,335 | A | * | 8/1993 | Narayana et al. ............. 415/115 |
| 5,700,130 | A | * | 12/1997 | Barbot et al. .................... 416/95 |
| 6,910,852 | B2 | * | 6/2005 | Simeone et al. .............. 415/115 |
| 6,981,841 | B2 | * | 1/2006 | Krammer et al. ............. 415/115 |
| 7,458,766 | B2 | * | 12/2008 | Dailey et al. ....................... 415/1 |
| 7,743,613 | B2 | * | 6/2010 | Lee et al. ......................... 60/782 |
| 7,870,742 | B2 | * | 1/2011 | Lee et al. ......................... 60/782 |
| 8,402,770 | B2 | * | 3/2013 | Garin et al. ..................... 60/806 |
| 2009/0004012 | A1 | * | 1/2009 | Caprario et al. .............. 416/189 |
| 2011/0123325 | A1 | * | 5/2011 | Morris et al. ............... 415/208.1 |
| 2012/0085104 | A1 | | 4/2012 | Garin et al. |

FOREIGN PATENT DOCUMENTS

| | | |
|---|---|---|
| FR | 2 937 371 A1 | 4/2010 |
| FR | 2 946 687 A1 | 12/2010 |
| GB | 1 531 037 A | 11/1978 |

OTHER PUBLICATIONS

Search Report issued in European Patent Application No. 11 17 8574 dated May 28, 2014.

* cited by examiner

GAS TURBINE ENGINE WITH TURBINE COOLING ARRANGEMENT

FIELD OF THE INVENTION

The present invention relates to a gas turbine engine, and a method of cooling a turbine section of a gas turbine engine.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

As shown in FIG. 2, the high pressure turbine comprises a rotor disc 36 to which a plurality of rotor blades 38 is attached via a disc rim. The rotor blades are in the path of the hot combustion products and thus require cooling to prevent failure. Air flow from the high pressure compressor, flowing through inner cavities of the rotor blades, is used to cool the rotor blades. The air flow 26 and 34 is bled from a final stage 24 of the high pressure compressor to ensure the pressure of the air in the rotor blades is greater than the surrounding combustion products.

The air flow 26 and 34 from the high pressure compressor also contacts a front face 48 of the rotor disc 36. This air flow has a high temperature and high specific entropy, but nonetheless provides sufficient cooling to the turbine blades. However, when contacting the front face of the rotor disc it can heat the rotor disc to undesirable temperatures, resulting in decreased life of the rotor disc, and can cause areas of high peak temperatures on the front face of the rotor disc, leading to large thermal gradients in the rotor disc.

To protect the rotor disc from failure, it is desirable to further cool the rotor disc 36. This can be done by routing cooling air flow to a rear face and a central bore of the rotor disc. However, the high specific entropy of the air from the final stage of the high pressure compressor makes it inefficient for cooling the rear face and the central bore of the turbine disc. Thus air flows 30 and 32 from lower pressure stages of the compressor can be used to cool the rear face and the central bore of the rotor disc. As a result, the rotor disc is in contact with air flows from different stages of the compressor, all of which are at different temperatures. This can create an undesirable thermal environment for the rotor disc, which can experience large thermal gradients and high thermal stresses. Thus the rotor disc can have a reduced life and compromised design. The different air flows also provide little control over the heat transfer coefficients between the rotor disc and surrounding air, leading to poor rotor disc thermal response, and correspondingly poor rotor blade shroud tip clearance.

GB 2420155 suggests an alternative method for supplying cooling air to the turbine blades. In this cooling system, air is bled from a stage of the compressor upstream of the final stage. The air is then passed through a space between the downstream face of the rotor disc and a vaned cover for re-pressurisation. The pressurised air then passes to the turbine blades via the disc rim.

This system can improve the efficiency of the rotor blade cooling, however it still suffers from the problem that air flow from the final stage of the high pressure compressor contacts the upstream face of the rotor disc, while cooler air from the upstream stage of the compressor surrounds other parts of the rotor disc creating undesirably large thermal gradients. In particular, the system does not address the problem of high peak temperatures on the front face of the rotor disc or high thermal stresses in the rotor disc.

SUMMARY OF THE INVENTION

Accordingly, an aim of the present invention is to provide a gas turbine engine comprising a turbine section cooling system that provides a better thermal environment for a rotor disc of a turbine.

In a first aspect, the present invention provides a gas turbine engine comprising in flow series a compressor section, a combustor, and a turbine section, the engine further comprising a turbine section cooling system including:
  a first compressed air bleed arrangement which bleeds a first flow of compressed air from a high pressure stage of the compressor section, the first flow of compressed air bypassing the combustor and arriving at the turbine section to form a sealing flow between a row of stator vanes and an adjacent downstream rotor disc (typically a high pressure stage rotor disc) and/or a cooling flow for either or both of the stator vanes and the rotor disc; and
  a second compressed air bleed arrangement which bleeds a second flow of compressed air from one or more lower pressure stages of the compressor section, the second flow of compressed air bypassing the combustor and arriving at the turbine section to form a cooling flow, a first portion of the cooling flow being routed to a front face of the rotor disc and a second portion of the cooling flow being routed to a rear face of the rotor disc.

The bleed air from the lower pressure stages of the compressor section is at a lower temperature than the bleed air from the high pressure stage. Thus advantageously, the front face of the rotor disc can be immersed in low temperature cooling air. This can lower peak temperatures on the front face. A further advantage results from cooling the rear face of the rotor disc. This can reduce the temperature difference between the front and back face of the rotor disc, which in turn reduces thermal stresses in the rotor disc. Furthermore, the lower temperature of the disc environment improves the life of is the disc.

The cooling system can also provide better control of heat transfer coefficients around the rotor disc surface, improving the rotor disc's thermal response.

The gas turbine engine of the first aspect may have any one or, to the extent that they are compatible, any combination of the following optional features.

The first portion of the cooling flow and the second portion of the cooling flow can be bled from different lower pressure stages of the compressor section.

Preferably, however, the second flow of compressed air is split into the first and second portions of the cooling flow after being bled from the one or more lower pressure stages of the compressor section. Advantageously, this allows the rotor disc front face and rear face to be immersed in cooling air from the same lower pressure stage(s) of the compressor section, thus creating a more thermally homogeneous environment around the rotor disc. Such an environment reduces thermal gradients, and therefore reduces thermal stresses, in the rotor disc.

Typically, the turbine section cooling system further includes re-pressurising means which re-pressurises the first and/or second portion of the cooling flow after the second flow of compressed air is bled from the one or more lower pressure stages of the compressor section. Preferably, the first portion of the cooling flow is re-pressurised in this way.

Typically, a row of turbine blades is mounted to a rim of the rotor disc. At least a part of the re-pressurised first and/or second portion of the cooling flow can then be subsequently routed into the turbine blades. Advantageously, the re-pressurised cooling flow can provide effective cooling of the turbine blades, the cooling air flow from the lower pressure stages being at a lower temperature than the first flow of compressed air from the high pressure stage. The re-pressurisation can ensure the cooling flow is at the required pressure.

Alternatively, however, the first flow of compressed air can be used to cool the turbine blades. For example, a portion of the first flow can be routed into the turbine blades. Optionally a further portion of the first flow can then be directed to form a sealing flow between the row of stator vanes and the rotor disc, and optionally another portion of the first flow can be routed into the stator vanes. In such an arrangement, the second flow of compressed air cools the disc, but may not be used to cool the turbine blades. The second flow of compressed air, after cooling the disc, can be used to seal the front and/or the rear rim of the disc, e.g. before being leaked into the working gas annulus.

Preferably, the re-pressurising means comprises a first centrifugal pump adjacent the front face of the rotor disc for pressurising the first portion of the cooling flow and/or a second centrifugal pump adjacent the rear face of the rotor disc for pressurising the second portion of the cooling flow.

The gas turbine engine typically has a drive arm connecting the rotor disc to the high pressure stage of the compressor section. The first centrifugal pump preferably penetrates the drive arm to extend over the front face of the rotor disc both outboard and inboard of the drive arm.

Suitably, the, or each, centrifugal pump comprises: a cover plate axially-spaced from the respective face of the rotor disc such that a channel producing radially outward delivery of the respective portion of cooling flow is formed between the cover plate and the respective face, and a row of circumferentially spaced vanes positioned in the channel and co-rotational with the rotor disc to pressurise the respective portion of cooling flow delivered through the channel. Advantageously, the cover plate can create a barrier between the first flow of compressed air from the high pressure stage of the compressor section and the front face of the turbine rotor disc. This can further enhance the cooling of the front face and the homogeneity of the thermal environment around the disc.

A backing plate may be mounted to the respective face of the rotor disc, the channel being defined between the cover plate and the backing plate.

Typically, the second portion of the cooling flow is routed via a central bore of the rotor disc. This allows cooling and sealing of the rotor disc bore. Advantageously, this can also further improve the homogeneity of the rotor disc's thermal environment.

Suitably, the second compressed air bleed arrangement may comprise passages for the second flow of compressed air extending radially inwards from the one or more lower pressure stages of the compressor section, the passages co-rotating with the one or more lower pressure stages to extract work from the second flow of compressed air.

Suitably, the second compressed air bleed arrangement may comprise a vortex reducer to reduce the tangential velocity of the second flow of compressed air as it is bled from the one or more lower pressure stages of the compressor section and thereby reduce swirl pressure losses in the second flow of compressed air. For example, the vortex reducer may comprise de-swirl nozzles (forming collectively "a tubeless vortex reducer"), or may comprise a tubed vortex reducer. US 2009282834 discusses both types of vortex reducer.

In a second aspect, the present invention provides a method of cooling a turbine section of a gas turbine engine which comprises in flow series a compressor section, a combustor, and the turbine section, the method comprising the steps of:

bleeding a first flow of compressed air from a high pressure stage of the compressor section, the first flow of compressed air bypassing the combustor and arriving at the turbine section to form a sealing flow between a row of stator vanes and an adjacent downstream rotor disc and/or a cooling flow for either or both of the stator vanes and the rotor disc;

bleeding a second flow of compressed air from one or more lower pressure stages of the compressor section, the second flow of compressed air bypassing the combustor and arriving at the turbine section to form a cooling flow;

routing a first portion of the cooling flow to a front face of the rotor disc; and routing a second portion of the cooling flow to a rear face of the rotor disc.

The method of cooling the turbine section of the second aspect corresponds to the engine of the first aspect. Accordingly optional features of the engine of the first aspect provide corresponding optional features in the method of the second aspect. Thus, typically, the method further comprises the step of: re-pressurising the first and/or second portion of the cooling flow after the second flow of compressed air is bled from the one or more lower pressure stages of the compressor section. Typically, a row of turbine blades is mounted to a rim of the rotor disc, and the method further comprises the step of: subsequently routing at least a part of the pressurised first and/or second portion of the cooling flow into the turbine blades. The gas turbine engine of the first aspect may be used to perform the method of the second aspect.

BRIEF DESCRIPTION OF THE DRAWINGS

Embodiments of the invention will now be described by way of example with reference to the accompanying drawings in which.

DETAILED DESCRIPTION

Figure 1:
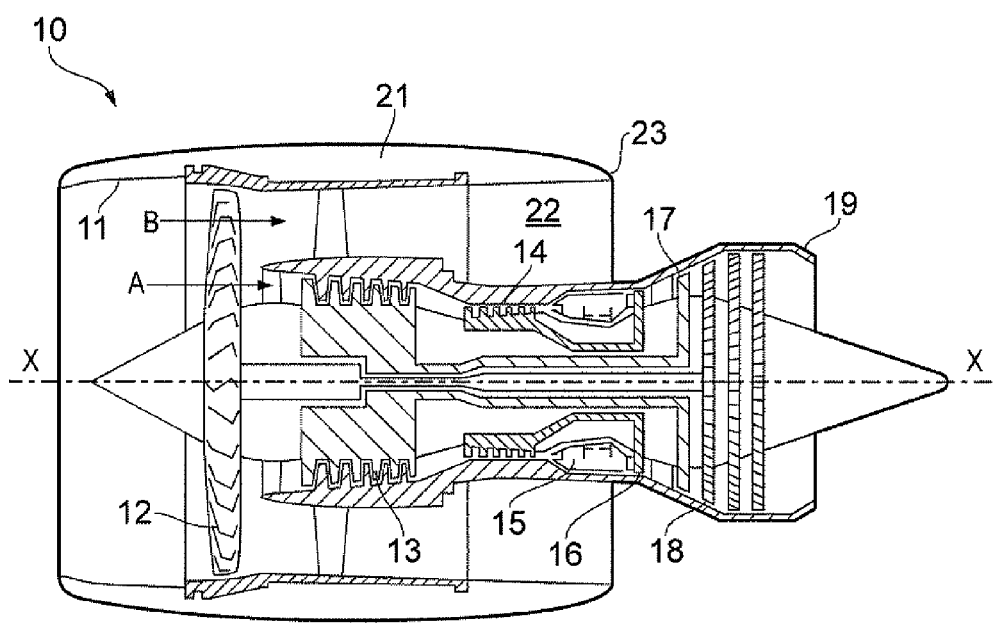
FIG. 1 shows schematically a longitudinal section through a ducted fan gas turbine engine.
Figure 2:
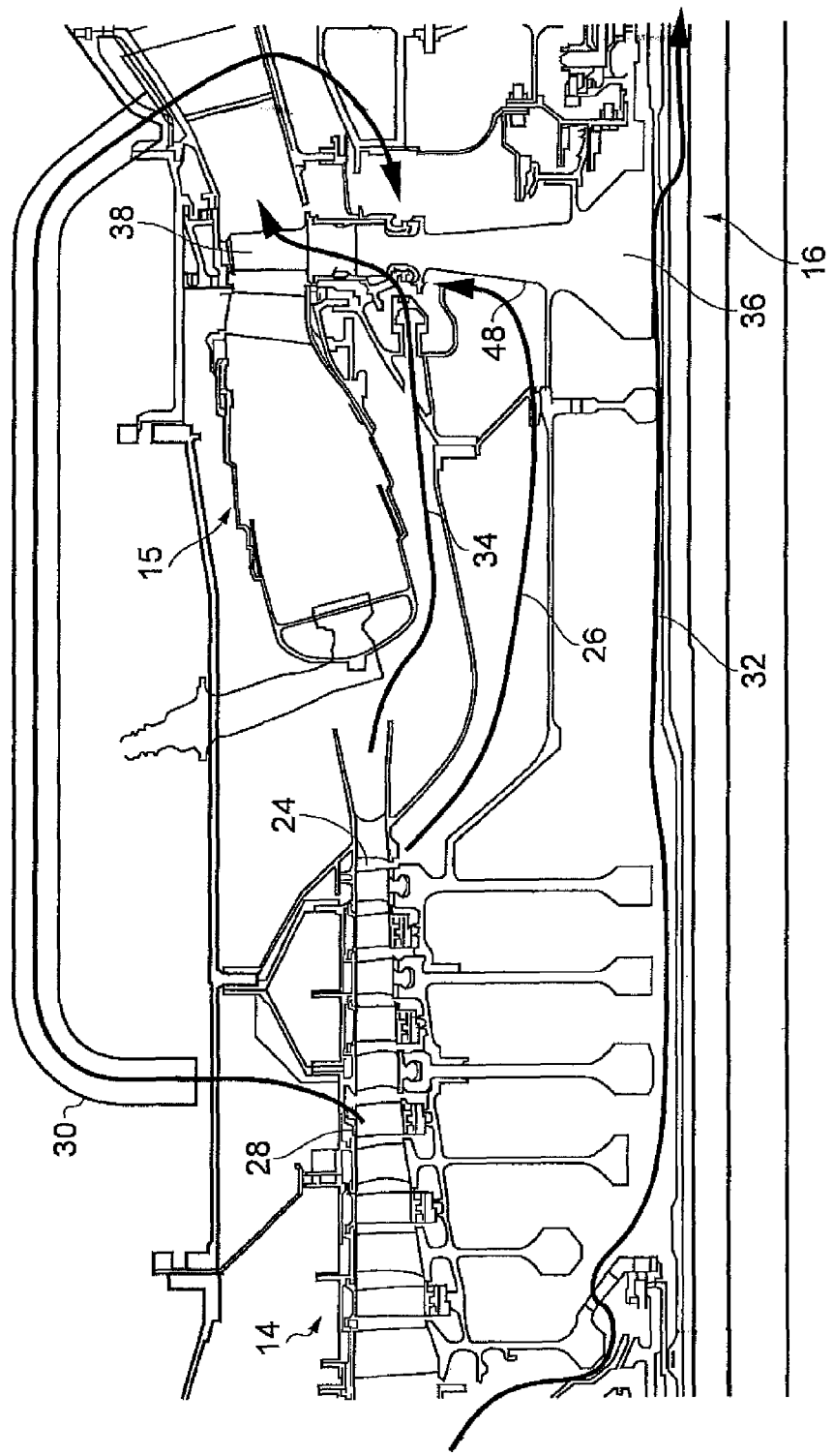
FIG. 2 shows schematically a longitudinal section through a high pressure compressor, combustion equipment, a high pressure turbine, and a conventional turbine section cooling system.
Figure 3:
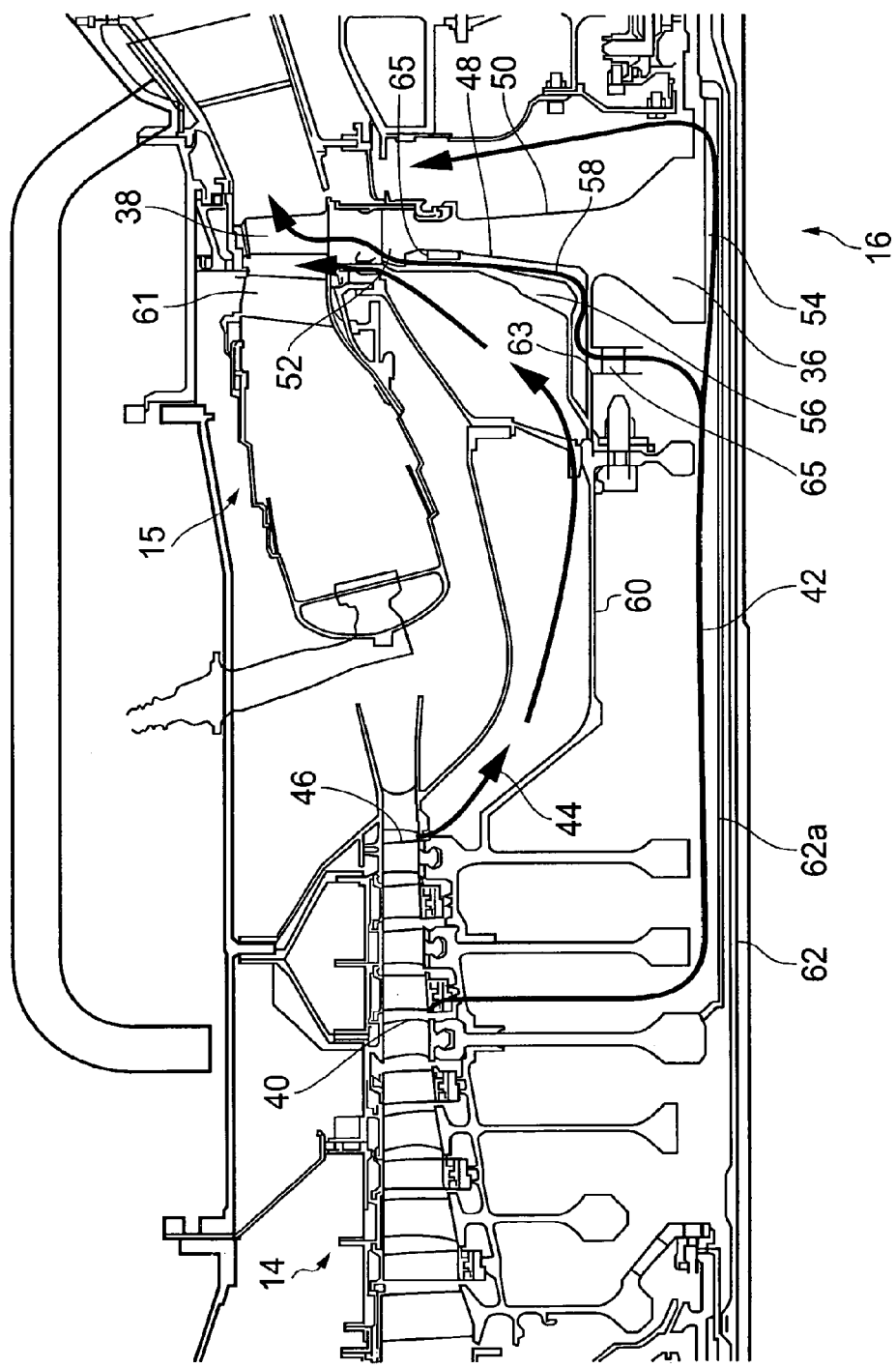
FIG. 3 shows schematically a longitudinal section through a high pressure compressor, combustion equipment, a high pressure turbine, and a turbine section cooling system of the present invention.

FIG. 3 shows schematically a longitudinal section through a high pressure compressor 14, combustion equipment 15, a high pressure turbine 16, and a turbine section cooling system of the present invention. The high pressure compressor has multiple stages, including a high pressure final stage 46 and a lower pressure mid stage 40, the mid stage being upstream of the final stage. Bleed holes are positioned in the final stage 46 and mid stage 40 of the high pressure compressor.

The high pressure turbine has a rotor disc 36, with a front face 48, a rear face 50 and a central bore 54. Turbine blades 38 are connected to the outer circumference of the rotor disc via a disc rim 52. The rotor disc 36 is connected to the high pressure compressor 14 by a drive arm 60. Drive shaft 62 and cooling air sleeve 62a extend through a bore 54 of the rotor disc. A cover plate 56 surrounds and is axially spaced from the front face 48 of the rotor disc, to form a channel 58 between the cover plate and the rotor disc. The cover plate has a row of circumferentially spaced vanes positioned in the channel.

In operation, air flow 44 is bled from the final stage 46 of the high pressure compressor. This air flow bypasses the combustor of the combustion equipment 15 and arrives at the high pressure turbine 16. It is then used to provide a sealing flow into the working gas annulus to prevent hot gas ingestion between the rotor disc 36 and a row of stator vanes 61 immediately forward of the disc. Although not shown in FIG. 3, a portion of the air flow may be fed into the vanes 61 to provide a cooling flow for the vanes. The cover plate 56 creates a barrier between this air flow and the front face 48 of the rotor disc, whereby the higher pressure air flow contacts the disc rim 52 but not the front face of the rotor disc.

Air flow 42 is also bled from the lower pressure mid stage 40 of the high pressure compressor 14. This air flow is directed towards the rotor disc 36 through a cavity formed between the drive arm 60 and the sleeve 62a. The air flow then splits into two portions before it reaches the rotor disc. A first portion passes through the channel 58 formed between the cover plate 56 and the front face 48 of the rotor disc. The air is pressurised as it passes through the channel, due to the shape of the channel, and then further pressurised as it passes through a series of vanes 65 on the cover plate. Effectively, the channel 58 and vanes 65 act as a centrifugal pump. Upon exiting the channel, the air enters holes, slits or a gallery in the disc rim 52. These holes, slits or gallery direct the air into the turbine blades 38. The blades are cooled internally by the air, which then exits the blades through surface holes to form a cooling film. The re-pressurisation of the cooling air prevents hot working gas being ingested through these holes.

Advantageously, the first portion of the cooling air 42 reduces peak temperatures on the rotor disc front face 48 relative to conventional cooling systems which use air flow from the final stage of the high pressure compressor to cool the front face.

The centrifugal pump can be modified by extending it inboard of the drive arm 60. For example, shaped radial passages can penetrate through the drive arm 60, which includes an aperture 63. A section of the cover plate 56 can then extend inboard of the drive arm.

A second portion of the air flow 42 passes through the central bore 54 of the rotor disc 36, providing sealing and cooling to the central bore. The second portion of the air flow then flows onto the rear face 50 of the rotor disc, providing sealing and cooling to the rear face.

Advantageously, the cooling system enables the rotor disc front face 48, rear face 50 and bore 54 to be immersed in cooling air from the lower pressure compressor stage 40. This reduces temperature differences between the front face, rear face and bore of the rotor disc 36. This in turn reduces internal thermal gradients and thermal stresses in within the disc, which improves the life and design of the disc. The better control of the temperature of the rotor disc and of the heat transfer coefficient between the disc and the surrounding air enhances the thermal response of the rotor disc and thereby improves the rotor blade shroud tip clearance.

A modification of this cooling system is to include an additional cover plate surrounding and axially spaced from the rear face 50 of the rotor disc 36 and to provide a series of vanes on the additional cover plate. The air flows at both the front 48 and rear 50 faces of the rotor disc can then be re-pressurised and used to cool the turbine blades 38. Alternatively, the cooling system may have the cover plate and vanes only at the rear face of the disc.

Either or both sets of cover plates and vanes could be replaced with a re-pressurising pump located more remotely from the rotor disc 36.

A further modification to the cooling system has the air flow 44 bled from the final stage 46 of the high pressure compressor provide internal cooling for the turbine blades 38. After cooling the disc, the air flow 42 bled from the lower pressure mid stage 40 can then simply provide a sealing flow for the front and/or the rear of the disc rim 52 before e.g. entering the working gas annulus.

Another modification to the cooling system is to bleed the air flow 42 from two different stages of the compressor; one stage supplying a first air flow passing through the channel 58 formed between the cover plate 56 and the front face 48 of the rotor disc, and the other stage supplying a second air flow to the rear face 50 of the rotor disc.

Yet another modification is to provide an additional air flow from a stage of the compressor other than the lower pressure compressor stage 40 for ventilating the central bore 54.

The present embodiment can be further modified by splitting the first portion of air flow 42 into two sub-portions, after it has passed the cover plate 56. One sub-portion can be used to cool the turbine blades 38 and the other sub-portion can provide a sealing flow to the rotor disc front. Yet a further modification is to allow air flow from the rear of the disc to be used for cooling the turbine blades 38. In such a modification, the first is portion of the air flow 42 could be used to provide a sealing flow to the rotor disc front.

The cooling system can include rotating radial passages at the lower pressure mid stage 40. The passages guide the air flow 42 bled from the lower pressure stage and could be formed by radial tubes or by radial channels in a cover plate attached to a compressor disc(s). The passages extend radially inwards and co-rotate with the lower pressure stage to extract work from the bled air.

Alternatively or additionally, the cooling system can include a vortex reducer, e.g. comprising de-swirl nozzles, at the lower pressure mid stage 40. The air flow 42 bled from the lower pressure stage passes through the vortex reducer to reduce the tangential velocity of the air flow and thereby decreases pressure losses in the air flow.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A gas turbine engine comprising:
    a compressor section, a combustor, and a turbine section in flow series;
    a drive arm connecting the turbine section with the compressor section; and
    a turbine section cooling system including:
        a first compressed air bleed arrangement which bleeds a first flow of compressed air from a high pressure stage of the compressor section, the first flow of compressed air bypassing the combustor and arriving at the turbine section to form a sealing flow between a row of stator vanes and an adjacent downstream rotor disc and/or a first cooling flow for the stator vanes and/or the rotor disc; and
        a second compressed air bleed arrangement which bleeds a second flow of compressed air from at least one lower pressure stage of the compressor section relative to the high pressure stage, the second flow of compressed air bypassing the combustor and arriving at the turbine section to form a second cooling flow, a first portion of the second cooling flow being routed to a front face of the rotor disc radially outwardly of the drive arm and a second portion of the second cooling flow being routed to a rear face of the rotor disc.

2. The gas turbine engine according to claim 1, wherein the turbine section cooling system further includes a re-pressurizing pump which re-pressurizes at least one of the first portion and the second portion of the second cooling flow after the second flow of compressed air is bled from the at least one lower pressure stage of the compressor section.

3. The gas turbine engine according to claim 2, wherein a row of turbine blades is mounted to a rim of the rotor disc, at least a part of the re-pressurized first portion and/or second portion of the second cooling flow being subsequently routed into the turbine blades.

4. The gas turbine engine according to claim 2, wherein the re-pressurizing pump comprises at least one of a first centrifugal pump adjacent the front face of the rotor disc for pressurizing the first portion of the second cooling flow and a second centrifugal pump adjacent the rear face of the rotor disc for pressurizing the second portion of the second cooling flow.

5. The gas turbine engine according to claim 4, wherein the drive arm connects the rotor disc to the high pressure stage of the compressor section, the first centrifugal pump penetrating the drive arm to extend over the front face of the rotor disc both outboard and inboard of the drive arm.

6. The gas turbine engine according to claim 4, wherein the at least one of the first centrifugal pump and the second centrifugal pump comprises:
    a cover plate axially-spaced from a respective face of the rotor disc such that a channel producing radially outward delivery of a respective portion of the second cooling flow is formed between the cover plate and the respective face, and
    a row of circumferentially spaced vanes positioned in the channel and co-rotational with the rotor disc to pressurize the respective portion of the second cooling flow delivered through the channel.

7. The gas turbine engine according to claim 5, wherein the at least one of the first centrifugal pump and the second centrifugal pump comprises:
    a cover plate axially-spaced from a respective face of the rotor disc such that a channel producing radially outward delivery of a respective portion of the second cooling flow is formed between the cover plate and the respective face, and
    a row of circumferentially spaced vanes positioned in the channel and co-rotational with the rotor disc to pressurize the respective portion of the second cooling flow delivered through the channel.

8. The gas turbine engine according to claim 1, wherein the second portion of the second cooling flow is routed via a central bore of the rotor disc.

9. The gas turbine engine according to claim 1, wherein the second compressed air bleed arrangement comprises passages for the second flow of compressed air extending radially inwards from the at least one lower pressure stage of the compressor section, the passages co-rotating with the at least one lower pressure stage to reduce swirl pressure losses in the second flow of compressed air.

10. The gas turbine engine according to claim 1, wherein the second compressed air bleed arrangement comprises a vortex reducer to reduce a tangential velocity of the second flow of compressed air as the second flow of compressed air is bled from the at least one lower pressure stage of the compressor section and thereby reduce swirl pressure losses in the second flow of compressed air.

11. A method of cooling a turbine section of a gas turbine engine which comprises in flow series a compressor section, a combustor, and the turbine section, and a drive arm connecting the turbine section with the compressor section, the method comprising:
    bleeding a first flow of compressed air from a high pressure stage of the compressor section, the first flow of compressed air bypassing the combustor and arriving at the turbine section to form a sealing flow between a row of stator vanes and an adjacent downstream rotor disc and/or a first cooling flow for the stator vanes and/or the rotor disc;
    bleeding a second flow of compressed air from at least one lower pressure stage of the compressor section relative to the high pressure stage, the second flow of compressed air bypassing the combustor and arriving at the turbine section to form a second cooling flow;
    routing a first portion of the second cooling flow to a front face of the rotor disc radially outwardly of the drive arm; and
    routing a second portion of the second cooling flow to a rear face of the rotor disc.

12. The method according to claim 11, further comprising:
    re-pressurizing at least one of the first portion and the second portion of the second cooling flow after the second flow of compressed air is bled from the at least one lower pressure stage of the compressor section.

13. The method according to claim 12, wherein a row of turbine blades is mounted to a rim of the rotor disc, and the method further comprises:
    subsequently routing at least a part of the re-pressurized first portion and/or second portion of the second cooling flow into the turbine blades.

* * * * *